Oct. 21, 1958 D. H. PUTNEY 2,857,247
METHOD FOR RECOVERING SPENT ALKYLATION ACID
Filed Oct. 6, 1955
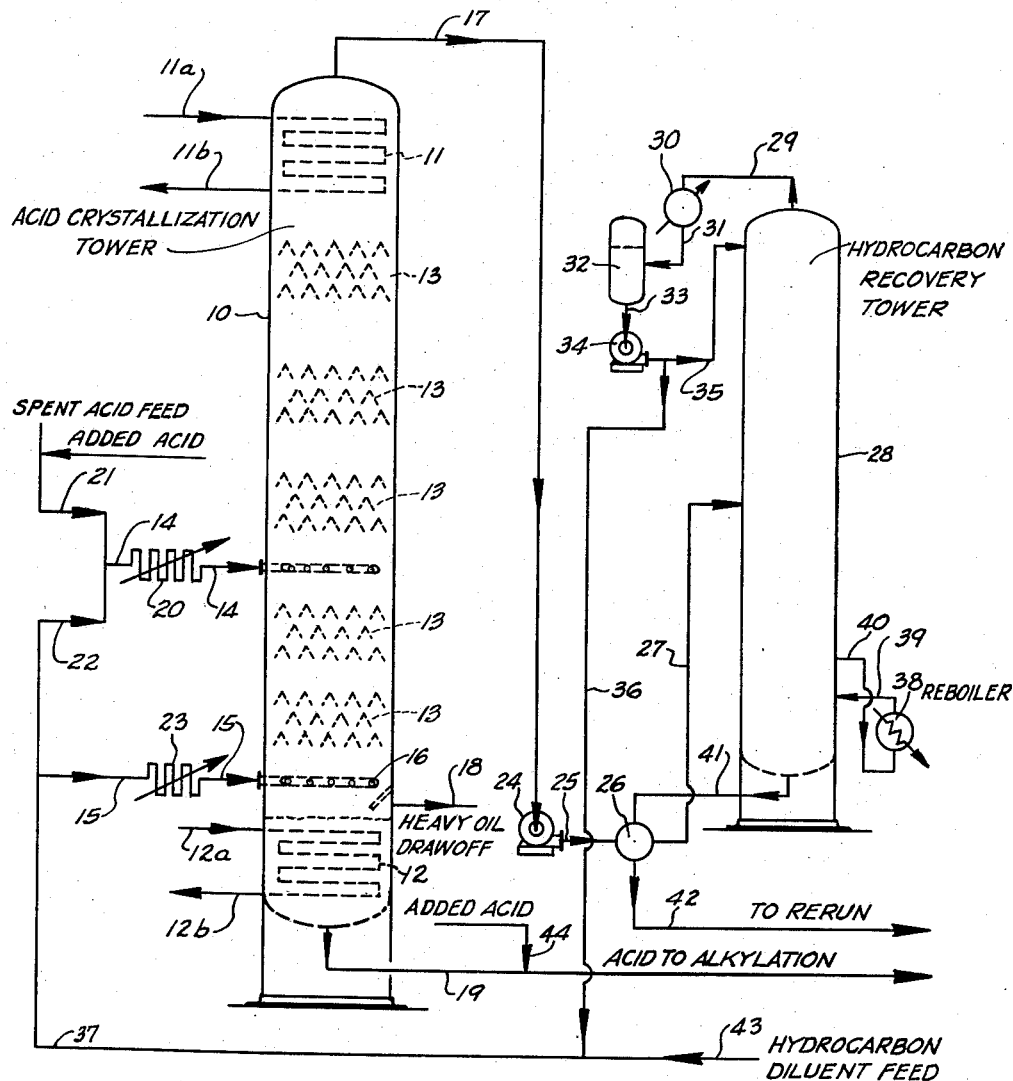
INVENTOR.
David H. Putney
BY
Thos. E. Scofield

United States Patent Office 2,857,247
Patented Oct. 21, 1958

2,857,247
METHOD FOR RECOVERING SPENT ALKYLATION ACID

David H. Putney, Fairway, Kans., assignor to Stratford Engineering Corporation, Kansas City, Mo., a corporation of Delaware Application October 6, 1955, Serial No. 538,855

4 Claims. (Cl. 23—173)

This invention relates to a method for the conditioning or reclamation of acid contaminated with organic matter or an acid which has had its titratable acidity reduced as in the alkylation of isoparaffins with olefins using acids as the catalyst.

The alkylation of isoparaffins with olefins is a widely practiced process. When using sulfuric acid as the catalyst, such alkylation is usually conducted by feeding fresh sulfuric acid catalyst at a strength of about 96 to 99%, withdrawing the acid after use as the catalyst at a strength of about 86 to 92% and replacing the withdrawn acid with additional fresh acid.

The withdrawn spent catalytic sulfuric acid usually contains only about 1 to 3% of water and about 5 to 13% hydrocarbon complexes or carbonaceous materials. In order to salvage the spent acid for reuse as a catalyst in the alkylation process, the hydrocarbon and carbonaceous material must be removed therefrom and the resulting pure sulfuric acid fortified with fuming acid or sulfur trioxide to bring it back approximately to its original strength.

Two methods are currently employed in the practice of reclaiming such spent sulfuric acid. The first process comprises burning the spent acid, purifying the resulting gases, converting the sulfur dioxide to sulfur trioxide and then producing fresh acid by the combination of water with the sulfur trioxide. The second process involves hydrolyzing the acid, separating carbonaceous material from the weak acid by settling, concentrating the weak acid to about 85% by cooking and then fortifying with fuming acid. Both of these methods involve considerable capital investment, the processes are rather complicated, operating and maintenance costs are high, and, in the case of the latter method, considerable fortification must be done.

The chilling of a mixture of sulfuric acid and hydrocarbons or other organic compounds with which the acid is immiscible results in the formation of pure acid crystals. The amount of water present in the system determines the strength of the acid forming these crystals and the strength of the acid in turn determines the temperature below which crystallization will occur. The instant invention makes use of this phenomenon in a vary simple and direct method for reclaiming the sulfuric acid content of the spent acid-hydrocarbon mixture rejected from an alkylation process.

Therefore, an object of the present invention is to provide a method for reclaiming spent alkylation acid which does not require the burning of the spent acid and conversion of the sulfur content to sulfur trioxide.

Another object of the invention is to provide a method for reclaiming spent alkylation acid which does not require hydrolyzing the spent acid.

Another object is to provide an acid reclaiming method by which the acid plant of a refinery may be more easily kept in balance and one which is economic for relatively small acid recovery installations.

A further object is to provide a method which does not require cooking or concentrating weak acids to stronger acids.

Still another object is to provide a reclaimed acid which requires a minimum of fortification with fuming acid to return it to its original strength.

Other and further objects of the invention will appear in the course of the following description.

In the drawing which forms a part of the specification and should be read in conjunction therewith, an embodiment of the inventive method is illustrated.

The single figure is a flow diagram showing one embodiment of the invention, the figure being entirely schematic in character.

The numeral 10 designates an elongated vertical separation vessel or tower which is to be operated liquid full. Tower 10 has chilling coil 11 at the top thereof with input and output flow lines 11a and 11b. Heating coil 12 at the bottom of vessel 10 has input and output flow lines 12a and 12b. Tower 10 has intermediate zones 13 of distribution packing or baffles which will not retain settling acid crystals. Feed inlet line 14 leads into the central portion of tower 10. Light hydrocarbon feed inlet line 15 leads to distribution header ring 16 positioned in tower 10 below packing zones 13. Light hydrocarbon drawoff line 17 connects into the top of tower 10. An intermediate heavy oil drawoff line 18 removes separated oil likely contaminated with organic sulfur compounds from tower 10 below distribution header 16. Acid drawoff line 19 discharges acid from the bottom of tower 10.

A chilling coil 20 is interposed in feed inlet line 14. A chilled light hydrocarbon, immiscible with the acid is pumped into the tower 10 through line 14. Spent acid from an alkylation operation is introduced to the system through line 21, being mixed with the light paraffinic hydrocarbon supplied through pipe 22 and inlet line 14. A portion of the light hydrocarbon may be diverted through line 15 to the lower section of the tower, a chilling coil 23 in the line serving to reduce its temperature to that desired before entering the crystallization zone.

Hydrocarbons withdrawn from the top of tower 10 through pipe 17 are charged by pump 24 through line 25, heat exchanger 26 and line 27 into the hydrocarbon recovery tower 28. Recovery tower 28 is equipped with refluxing apparatus to control top tower temperatures comprising an overhead drawoff line 29, cooling condenser 30 connected by pipe 31 to receiver 32, liquid being returned from the receiver to the tower through pipe 33, pump 34 and line 35. Any part or all of the fluids discharged from receiver 32 may be returned for use in the acid crystallization tower 10 through lines 36, 37, 15 or through pipe 22 for mixture with the spent acid in pipe 14. A reboiler 38 connected by pipes 39 and 40 to the lower portion of tower 28 maintains the hydrocarbon recovery tower at the desired temperature. Bottoms from the recovery tower 28 are withdrawn through pipe 41, brought in heat exchanging relation with the incoming light hydrocarbon in exchanger 26, then directed to rerun apparatus (not shown) through pipe 42. Hydrocarbon diluent feed is supplied to the system through line 43.

Referring to the drawings, any hydrocarbon liquid at the operating temperatures hereinafter set forth and resistant to acid, preferably a light paraffinic hydrocarbon diluent such as propane, normal butane, isobutane, normal pentane, isopentane, alkylate or a mixture of two or more such hydrocarbons as would be available from the flash drum or suction trap in an alkylation plant using evaporative cooling (such a system being disclosed in my Patent No. 2,664,452, entitled "Process for Alkylation Utilizing Evaporative Cooling" and my pending application Ser. No. 450,192 entitled "Alkylation of Hydrocarbons Utilizing Evaporative Cooling," filed August 16, 1954) is introduced through pipes 43, 37 and 22 to be mixed with the spent acid brought through line 21. The mixture passes through a chilling coil 20 where its temperature is reduced below that at which the acid will form solid crystals, for example, zero degrees Fahrenheit (0° F.). Alternately the light hydrocarbons may be chilled by other means such as self-evaporative cooling by the evaporation of a portion thereof at reduced pressure, compressing and condensing the vapors and returning the condensate to the chilled liquid portion. The light paraffinic hydrocarbons employed as the diluent should be non-reactive with the acid. The amount of diluent hydrocarbons used should be sufficient to reduce the viscosity of the acid-hydrocarbon mix to a point at which it is easily handled and at which the acid crystals will be readily formed and easily settled from the diluent vehicle. The temperature at which the acid will form solid crystals is in the order of minus twenty degrees Fahrenheit (−20° F.) to minus twenty-five degrees Fahrenheit (−25° F.) if the sulfuric acid and water content of the mixture is substantially ninety-two percent (92%) strength. Should the acid strength in the mixture decrease, the crystallization temperature of the acid increases until at eighty-five percent (85%) acid strength the temperature at which crystallization occurs is in the order of plus thirty degrees Fahrenheit (+30° F.) to plus forty degrees Fahrenheit (+40° F.). Also, should the acid strength increase above ninety-two percent (92%), the temperature of crystallization also increases until at ninety-six percent (96%) strength the crystallization range is of the order of plus fifteen degrees Fahrenheit (+15° F.) to plus twenty degrees Fahrenheit (+20° F.). Generally speaking, most alkylation spent acids require a temperature in the range of plus ten degrees Fahrenheit (+10° F.) to minus twenty degrees Fahrenheit (−20° F.) in order to effect crystallization thereof.

The above-mentioned chilled mixture of light normal paraffinic hydrocarbons and spent acid upon leaving the chilling coil 20 is introduced into the central portion of the crystallization tower 10 through line 14. The acid crystals formed in the chilling coil and/or tower have a specific gravity in the order of 1.7 to 1.9 and readily separate from the liquid hydrocarbon diluent which has an average specific gravity in the order of .5 to .75. Thus, the crystals gravitate downwardly and the hydrocarbons rise through the tower. The vessel or tower in which crystallization and separation of the acid takes place is sized so the velocity of the rising hydrocarbons is very low. Packing or baffles are contained in the tower to prevent channeling and to disperse the acid through the diluent to promote crystallization of the acid.

Functioning as a wash liquid for the separated acid crystals is the light hydrocarbon feed into a lower portion of the tower through line 15. This additional light hydrocarbon stream, together with that supplied through line 14, rises through the tower 10, passing countercurrent to the falling acid crystals and washing them free of contaminating materials which were present in the spent acid and which tend to cling to the surface of the crystals. Coil 23 in line 15 serves to chill the wash liquid well below crystallization temperature of the acid, for example, to minus thirty degrees Fahrenheit (−30° F.). The distribution zones 13 are either packed with inert material or have baffle members which provide distribution of the upwardly flowing stream of paraffinic hydrocarbons and the settling acid crystals. During this counterflow of the acid crystals and diluent, the crystal surfaces are washed free and clean of heavy hydrocarbons or sludge which may have been present in the spent acid feed, some of which are carried off in solution with the light hydrocarbons, the insolubles gravitating toward the bottom of the tower where they are eliminated from the system as described hereinafter.

A heating coil 12 is preferably positioned in the base of the tower 10 to furnish heat to raise the temperature in the zone surrounding it to a level above the melting point of the acid crystals, for example 0° F. Thus, when the acid crystals enter this zone, they are melted and revert to a liquid condition. With the reversion of the acid crystals to the liquid phase, any C3 or C4 paraffins carried down with the crystals are readily separated. A liquid level of acid is maintained to submerge or partially submerge heating coil 12. This acid level is below the perforated pipe 16 through which the wash liquid is introduced. The melted acid readily separates from the light hydrocarbons by gravity, the latter passing upwardly through the column carrying with them in solution any soluble hydrocarbons which form a part of the spent acid feed. As an alternate method of withdrawing the acid from the tower, the acid crystals may be flushed or washed out as a slurry with a stream of liquid isobutane, alkylate or suitable hydrocarbon. In this modification, there would be no heating as described and the temperature in the base of the tower at the level of acid removal would remain below the acid liquefying level.

There may also be present in the spent acid heavy hydrocarbon complexes or carbonaceous materials not soluble in the light hydrocarbon diluent and wash liquid. These materials are always lighter than the acid but heavier than the light hydrocarbon and will accumulate as an intermediate layer above the liquid acid layer. Provision is made in the tower immediately above the liquid acid level to draw off these heavier hydrocarbons through pipe 18. This heavy oil drawoff is positioned between the wash liquid distribution header 16 and the liquid acid level. A baffle is positioned over the drawoff line to prevent discharge of the wash liquid and diluent. Without the removal of this heavy insoluble material, the crystallization tower 10 would possibly become logged with this material, rendering it inoperable.

The light paraffinic hydrocarbons supplied through said line 15 together with the hydrocarbons separated from the acid and heated in the lower portion of the tower rise and merge with the hydrocarbons added with the spent acid through line 14, functioning both as a diluent in which crystallization of the acid takes place and a washing medium for purification of the acid crystals. Since tower 10 is operated liquid full, the light hydrocarbons pass off through line 17 to the hydrocarbon recovery system. To safeguard against acid carryover, a chilling coil 11 is provided in the top of the tower to maintain the temperature of the acid hydrocarbons in that zone well below the temperature of crystallization of any acid present (for example minus thirty degrees Fahrenheit (−30° F.)) so that any acid reaching the zone in which the coil is located will crystallize and settle to the bottom of the tower.

The hydrocarbons passing overhead through line 17 are charged by pump 24 through heat exchanger 26 to hydrocarbon recovery tower 28 where the original light hydrocarbon diluent material is taken overhead within a predetermined boiling range, the heavier dissolved hydrocarbons and contaminants being removed from the tower bottom. The purified light hydrocarbon is recycle through lines 36 and 37 to crystallizing tower 10 while the undesirable bottoms are diverted through lines 41 and 42 to rerun apparatus not shown. It will be understood that should the spent acid contain hydrocarbons lighter than those used as diluent in the chilling step (C3 or C4 hydrocarbons) these lighter hydrocarbons must be removed from the recycle stock before they are returned to the crystallization zone or tower.

In the crystallization zone between line 14 and coil 11, the acid crystals are separated and settle by gravity, passing downwardly through the tower in counterflow relation with the upflowing diluent. During the settling period, the acid crystals are caused to migrate through the packing or baffling which is spaced apart sufficiently to permit passage of the crystals and at the same time offer a partial barrier which distributes the flow evenly throughout the tower to prevent channeling. Undissolved hydrocarbon complexes or carbonaceous material insoluble in the hydrocarbon diluent are withdrawn through line 18 and any relatively heavy hydrocarbons carried overhead in solution through pipe 17 are removed from the system through line 42, for diposal or further processing.

The liquid acid leaving the base of the tower 10 through acid drawoff line 19 in most cases will not be as high in strength as the original acid used in alkylating operations. In most cases the strength of the liquid acid leaving the base of tower 10 will be in the order of ninety-four percent (94%) to ninety-seven percent (97%) sulfuric acid although it may be somewhat lower. Although this strength may under some conditions be satisfactory for alkylation purposes, it should preferably be fortified with fuming acid or SO₃ to bring it back to the original feed strength of approximately ninety-eight percent (98%) strength; otherwise, the water content in the acid will gradually build up and eventually the acid will be too weak to act efficiently as a catalyst. Through line 44 fuming acid may be supplied to the purified acid drawn off through line 19 to accomplish this purpose. The amount of fuming acid required to rejuvenate the purified product discharged from the base of the tower is but a small fraction of that required to fortify acids recovered from hydrolyzing and reconcentrating plants.

Mention has been made of the melting point of the acid catalyst and its tendency to lose strength with use and during recovery. It should be noted as well that relatively slight dilution causes a wide variance in its melting point or the temperature at which the acid crystalizes which is the characteristic of primary interest in the instant method. For example, in the range of acid concentration, from ninety-two percent (92%) to one hundred percent (100%), considering only water dilution, temperautres at which the acid crystallizes will vary from about minus twenty-two degrees Fahrenheit (−22° F.) to plus forty-five degrees Fahrenheit (+45° F.). To maintain this minimum temperature may not be economically feasible, particularly if a satisfactory acid catalyst can be crystallized out at a higher temperature or can be produced by higher temperature crystallization and fortification with the addition of proper amounts of fuming acid. In other words, while the crystallization tower temperature will be governed to an extent by the existing acid concentration, there is also possible an adjustment between tower temperatures and the amount of added fuming acid to obtain a satisfactory and economical balance to produce the desired product. This control and balance provides facilities to maintain a more uniform tower operation and the production of a more efficient catalyst. In fact, should tower temperatures correspond to the temperature of liquids prevailing in an alkylate system utilizing evaporative cooling as described in my Patent No. 2,664,452 and pending application Ser. No. 450,192, such liquids, if inert to the acid catalyst, could well be used as the diluent in the crystallization tower.

To recapitulate, the process for recovering spent acid catalyst from the alkylation of isoparaffins with olefins comprises the steps of—

(1) Mixing the spent acid with a diluent hydrocarbon,
(2) Reducing the temperature of the mixture to or below the crystallization temperature of the acid in the mixture,
(3) Counterflowing the resultant crystals of acid with the chilled diluent in the crystallization zone,
(4) Introducing a purifying hydrocarbon diluent to counterflow and wash the acid crystals,
(5) Maintaining one end of the crystallization zone below the crystallization temperature of the acid and the other end of the crystallization zone under certain circumstances a liquefying temperature of the acid component,
(6) Withdrawing separately from the higher temperature section of the crystallization zone acid and heavy hydrocarbon components,
(7) Withdrawing the hydrocarbon diluent component from the lower temperature section of the crystallization zone,
(8) Fractionating the diluent hydrocarbon withdrawn from the lower temperature section of the crystallization zone and recycling the purified diluent for mixture with the spent acid,
(9) Fortifying the purified acid component withdrawn from the higher temperature section of the crystallization zone for reuse.

From the foregoing it will be seen that this invention is one well adapted to attain all of the ends and objects hereinabove set forth together with other advantages which are obvious and which are inherent to the method.

It will be understood that certain features and subcombinations are of utility and may be employed without reference to other features and subcombinations. This is contemplated by and is within the scope of the claims. claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An acid recovery process for recovering sulfuric acid contaminated with organic matter comprising the steps of maintaining a single liquid full crystallization zone having upper, lower and intermediate portions, mixing the contaminated acid with an additive diluent paraffinic hydrocarbon of low molecular weight which is unreactive with the acid, reducing the temperature of the mix below the crystallization temperature of the acid in the mixture, introducing the mix in the intermediate portion of the crystallization zone whereby the diluent hydrocarbon tends to rise in said zone and the acid crystals to fall therein in counterflow relationship to one another, introducing a washing diluent hydrocarbon of the same character as the additive diluent hydrocarbon below the crystallization temperature of the acid in the crystallization zone below the level of introduction of the mix to counterflow and wash the acid crystals, maintaining at least a portion of the crystallization zone above the level of the mix input below the crystallization temperature of the acid, maintaining at least a portion of the crystallization zone below the level of the washing diluent input above the crystallization temperature of the acid, withdrawing from the higher temperature zone an acid component, and withdrawing from the lower temperature zone a diluent hydrocarbon component.

2. An acid recovery process as in claim 1 wherein any heavy hydrocarbon component present in the spent acid introduced into the crystallization zone is also withdrawn from the higher temperature zone.

3. An acid recovery process as in claim 1 wherein any heavy hydrocarbon component present in the spent acid introduced in the crystallization zone is withdrawn from the upper level of the higher temperature zone.

4. An acid recovery process as in claim 1 wherein the hydrocarbon diluent component withdrawn from the lower temperature portion of the crystallization zone is fractionated and the portion thereof comprising the additive paraffinic hydrocarbon of low molecular weight unreactive with the acid is recycled and mixed with additional spent acid to be input into the crystallization zone.

References Cited in the file of this patent

UNITED STATES PATENTS

| 2,036,299 | Robinson | Apr. 7, 1936 |
| 2,254,788 | Ballard | Sept. 2, 1941 |
| 2,593,128 | Felter | Apr. 15, 1952 |
| 2,716,592 | Skelly et al. | Aug. 30, 1955 |